TEMPLATE TRACER

Filed March 30, 1967 2 Sheets-Sheet 1

INVENTOR.
HERMAN E. RADKE
BY Fishman & Van Kirk
ATTORNEYS.

April 9, 1968 H. E. RADKE 3,376,646

TEMPLATE TRACER

Filed March 30, 1967 2 Sheets-Sheet 2

INVENTOR.
HERMAN E. RADKE

BY Fishman & Van Kirk

ATTORNEYS.

United States Patent Office 3,376,646

Patented Apr. 9, 1968

3,376,646

TEMPLATE TRACER

Herman E. Radke, 131 Glendale Ave., Hartford, Conn. 06106

Filed Mar. 30, 1967, Ser. No. 627,154
7 Claims. (Cl. 33—25)

ABSTRACT OF THE DISCLOSURE

Pantograph apparatus wherein a workpiece is moved about a stationary cutting tool in accordance with the motion of a template about a stylus roll. The stylus rolls may be readily changed and thus the work may be machined to the desired dimensions in a stepwise fashion by means of driving the template around stylus rolls of decreasing diameter. Dual drive means for the template are provided so that the template may be moved about the stylus roll while simultaneously being held against the stylus roll.

BACKGROUND OF THE INVENTION

(1) *Field of the invention*

The present invention relates to template tracers. More particularly, the present invention is directed to a pantograph type template tracer wherein both the work piece and template are mounted upon the pantograph and are respectively moved about a cutting tool and a stylus. Accordingly, the general objects of the present invention are to provide novel and improved apparatus of such character.

(2) *Description of the prior art*

Pantograph type template tracers are well known in the prior art. The prior art devices are either the type wherein the template and work are respectively driven about stationary stylus and tool means or the stylus and tool holder may be affixed to the pantograph and thus respectively moved about a stationary template and work piece. Regardless of whether the tool is moved to the work or the work to the stationary tool, prior art pantograph template tracers possessed certain inherent disadvantages.

As a first of the disadvantages of the prior art, it has previously been impractical to employ a pantograph type mechanism for working a part in step-wise fashion from the rough cut to the desired finished size. Previous attempts at such step-wise machining have typically been characterized by the use of a plurality of templates of different size which were installed one after the other on the apparatus thereby enabling the finished size to be approached in steps. The use of a plurality of templates precipitates obvious disadvantages. For example, the templates themselves must be carefully machined and thus they are relatively expensive. Secondly, a supply of large templates for each work piece shape presents obvious storage problems. Thirdly, the installation of a template on a pantograph is a relatively time consuming task and may require the changing of the length of the legs of the pantograph.

A further problem inherent in the prior art templates tracers was the lack of mechanically reliable means to produce the relative motion between the template and stylus while maintaining contact between the two. The typical prior art drive mechanism for a template or stylus was either unduly complex from a mechanical standpoint and thus quite expensive or, considering the other extreme, did not provide for continued firm contact between the template and stylus.

From an operator's standpoint, the means in the prior art for producing relative motion between a template and stylus were relatively insensitive to abnormalities in the machining process. This was in part, occasioned by the lack of suitable drive mechanisms for the moving parts of the apparatus. The lack of suitable drives, coupled with the fact that the operation of the prior art apparatus of this character required relatively skilled personnel, often resulted in poor workmanship and a high rate of tool breakage.

An additional problem associated with prior art template tracers was occasioned by constructions which permitted excessive play between moving parts of the apparatus. Such excessive play restricted the accuracy of the devices, caused excessive wear of the parts comprising the apparatus and contributed to the breakage of tools.

SUMMARY OF THE INVENTION

The present invention comprises a template tracer which overcomes the aforementioned and other problems inherent in prior art devices of such character. The template tracer of the present invention comprises a pantograph type linkage upon which is mounted both the work and a template. By driving the template around a readily replaceable stylus roll, the work is moved with relation to a cutting tool such that machining to a shape commensurate with that of the template results. The stylus roll is mounted for free rotation upon a rack member and the rack member itself may be rotated about the axis of the stylus roll by a first drive means. The template is mounted above the rack member in such a manner that it rotates therewith and, in addition, the template may be driven along the rack member by a second drive means. A novel arrangement of a gear and bearing cooperates with the rack member to eliminate play between the rack and the means which drives the template therealong. Machining may be accomplished in step-wise fashion merely by interchange of the stylus rolls.

BRIEF DESCRIPTION OF THE DRAWING

The foregoing and other features and advantages of the present invention will become apparent to those skilled in the art by reference to the accompanying drawing wherein like reference numerals refer to like elements in the various figures and in which:

Referring now to FIGURES 1 and 3, a preferred embodiment of the present invention is shown supported on a table 10. The apparatus comprises a pantograph having four arms; indicated generally at 12, 14, 16 and 18; which define a parallelogram. As with prior art pantographs, the shape of the parallelogram may be varied by rotating the arms relative to one another about vertical axes through their points of interconnection.

Figure 6:
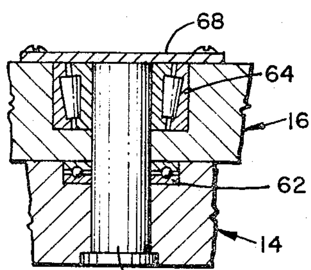
FIGURE 6 is a cross-sectional view, taken along line 6—6 of FIGURE 3, showing the novel arrangement of the bearings at the junction points of the pantograph arms of the embodiment of FIGURE 1.

In the present invention, as may best be seen from FIGURE 6, the relative rotation of the arms to vary the parallelogram is facilitated by a novel arrangement of bearings installed at each point of interconnection between a pair of arms. Thus, lower arm 14 may be rotated relative to upper arm 16 by means of a ball or roller thrust bearing 62 positioned between arms 14 and 16 in a recess provided therefore in arm 14. Lower arm 14 is affixed to pivot shaft 66, for example by a shrink fit, and upper arm 16 turns about shaft 66 on a tapered roller bearing 64. The assembly is secured together by a cap 68 which is attached to the top of shaft 66 by means of a screw or screws not shown.

A portion 14*a* of arm 14 is permanently affixed to table 10 by means of a pin 20 and is free to rotate about pin 20. A portion 12*a* of arm 12 engages a template tracer-drive assembly, indicated generally at 22, which will be described below in detail.

A work piece 24 is affixed to the upper side of arm 16, as by pins 26, and thus moves with arm 16. A rotary cutting tool 28, which is driven by means not shown, turns about an axis perpendicular to the plane defined by the top of table 10. In the manner to be described below, work piece 24 is urged into contact with cutting tool 28 to shape the work piece in conformity with a template location on portion 12*a* of arm 12.

The template, which comprises a large, scale model of the desired finished configuration of the work, is located in template tracer-drive assembly unit 22. The template 30 will be affixed to portion 12*a* of pantograph arm 12 by means of pins 32 and thus will move with arm 12. Work is performed by driving template 30 about a stylus member 34; the motion of the template being transmitted to the work piece 24.

Pantographs per se being well known in the art, the description of the setting up of the pantograph whereby the length of the arms and size of the template are chosen so as to result in the proper relationship between template and finished part size will not be discussed herein. Accordingly, the discussion below will be directed to the novel features of the present invention.

Figure 4:
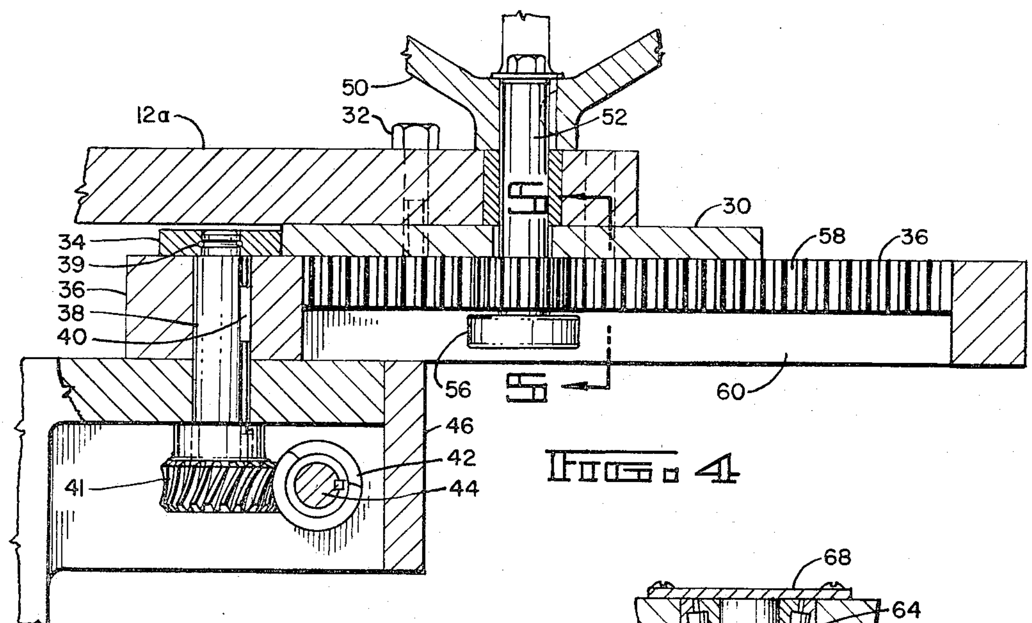
FIGURE 4 is an enlarged side elevation view, taken along line 4—4 of FIGURE 1, showing the template tracer-drive assembly of the present invention in cross-section.

Template tracer-drive assembly mechanism 22 comprises, as noted above, portion 12*a* of pantograph arm 12, with template 30 pinned thereto, and a stylus member 34. Stylus member 34 comprises a roll which is rotatably mounted on a rack member 36. For the reasons to be explained in detail below, stylus member 34 is readily removable so as to facilitate use of stylus rolls of different size. Thus, as may best be seen from FIGURE 4, stylus roll 34 is attached to the end of a shaft 38 by means of a split ring 39. The stylus rolls may thus be snapped into position and, when installed on the end of shaft 38, the stylus rolls are free to rotate about the end of shaft 38.

Figure 1:
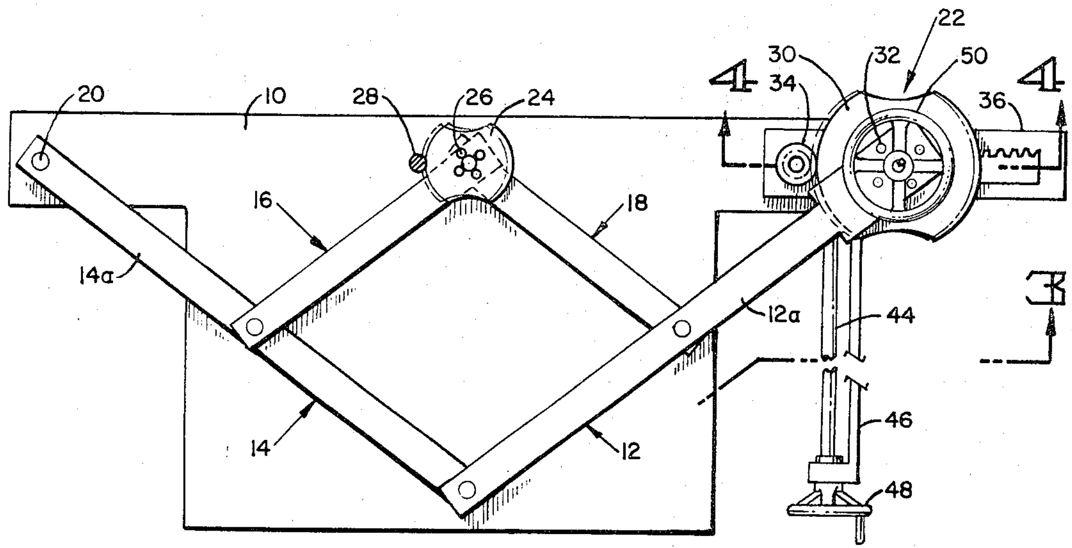
FIGURE 1 is a plan view of a first embodiment of the present invention.

Shaft 38 extends through rack member 36 at a point adjacent one end thereof and is keyed to rack member 36 as shown at 40. Shaft 38 also extends through table 10 and, at its lower end, has a worm gear 41 affixed thereto. Worm gear 41 is driven by a worm 42 on the inner end of a drive shaft 44. Referring again to FIGURE 1, it may be seen that shaft 44 extends outwardly from the template tracer-drive assembly mechanism 22, is supported by an extension 46 of table 10 and, on its outer end, is equipped with a manually operated drive wheel 48. For the purpose to be explained below, rotation of drive wheel 48 causes rack member 36 to rotate about the axis of shaft 38.

Figure 5:
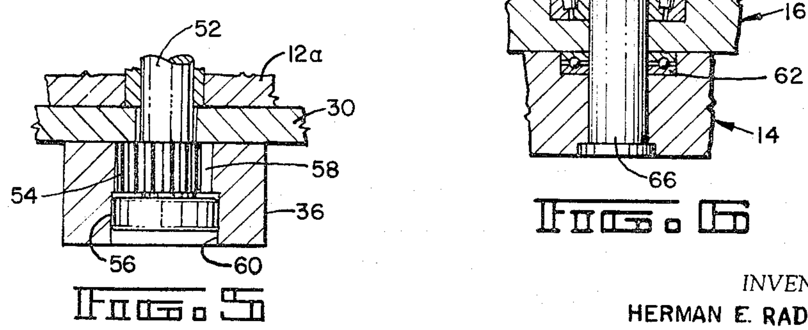
FIGURE 5 is a view, taken along line 5—5 of FIGURE 4, showing in cross-section a portion of a preferred drive assembly for the present invention.

The template tracer-drive assembly mechanism 22 also comprises a second drive wheel 50 which is mounted above the template 30. The drive wheel 50 is keyed to shaft 52 and held on shaft 52 by means of a bolt. Shaft 52 passes through portion 12*a* of pantograph arm 12, template 30 and into the slot in rack member 36. As may best be seen from FIGURE 5, the lower end of shaft 52 has a gear 54 and a bearing 56 affixed thereto; the gear being positioned above the bearing and both being held to the end of shaft 52 by means of a screw, not shown. Gear 54 engages teeth 58 along one side of the slot in rack member 36. Rack teeth 58 extend approximately half way through the rack member 36 and, in the region beneath teeth 58, the rack member is provided with a longitudinal slot 60 having a width commensurate with the diameter of bearing 56. This arrangement of slot 60 and bearing 56 which fits snugly therein eliminates play between the rack members and drive shaft 52.

In view of its novel construction, the present invention is very portable. When it is desired to use the invention, it is merely placed on the table of a suitable cutting tool. To facilitate positioning on the table of the cutting tool, table or member 10 of the present invention is provided with keys, not shown, which fit into a T slot in the table of the tool.

Figure 3:
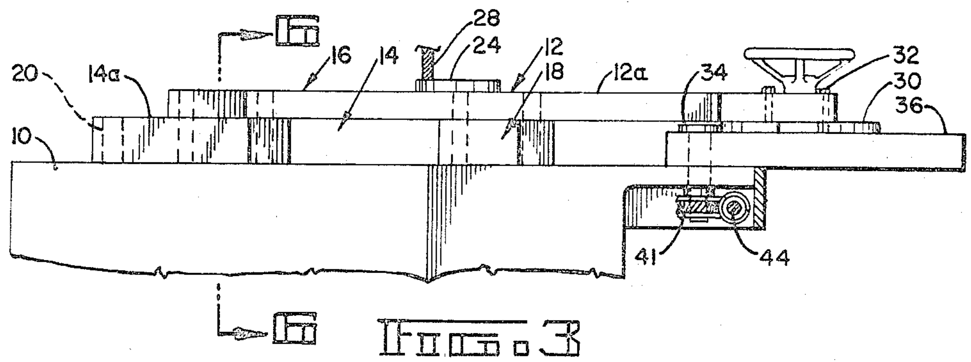
FIGURE 3 is a side view, partly in section, taken along line 3—3 of FIGURE 1.

After installing the present invention on the tool, work piece 24 is pinned to arm 16 of the pantograph and template 30 is similarly pinned to portion 12*a* of arm 12 of the pantograph. As will be obvious from FIGURES 3–5, at this time the template tracer-drive assembly 22 will be partially disassembled so that template 30 may be moved into position between rack member 36 and arm portion 12*a*. Both the work piece and template are provided with a pattern of holes through which the locking pins may be inserted. In a case of the template, when these holes are lined up with the holes in arm portion 12*a*, pins 32 will be inserted. Next, drive shaft 52, with gear 54 and bearing 56 installed thereon, will be inserted from the bottom into rack member 36. Shaft 52 will pass through a hole provided therefore in the center of template 30 and will extend through arm portion 12*a*. Finally, handle 50 will be bolted onto the end of shaft 52.

Once the template and work have been installed on the apparatus, a tool, for example an end mill, will be installed in its holder-drive mechanism. A stylus roll 34 will also be chosen and snapped into position on the end of shaft 38. Considering the case where the pantograph has a 2:1 ratio between the template and finished work size, an end mill will be selected which is smaller than twice the size of the smallest radius on the work to be produced. A finish stylus will be selected which is twice the diameter of the end mill. Several larger roughing stylii are also selected. As noted above, a particularly novel feature of the present invention is that the apparatus will be provided with a plurality of stylus rolls and the initial stylus roll employed will be larger than that which will give the desired finished part size. As is well known, the limits of motion of the pantograph mounted work piece 26 will, in part, be determined by the diameter of the stylus roll; a particular roll cooperating with the particular template to provide, taking the size of the pantograph into consideration, the desired finished size. Since stylus rolls 34 are held down by gravity rather than set screws or the like, they are readily replaced. The present invention thus permits the work piece 24 to be brought to within the desired tolerance in step-wise fashion by making repeated passes of the work piece about the tool, each pass being made with a slightly smaller stylus roll contacting template 30.

Figure 2:
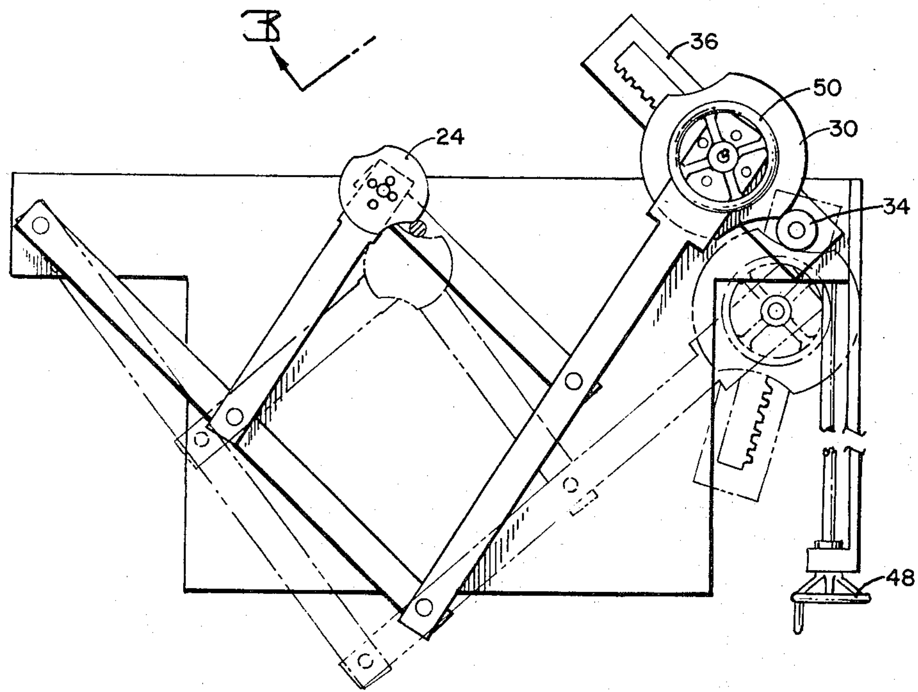
FIGURE 2 is a plan view of the embodiment of FIGURE 1 depicting the motion of the various elements during a machining operation.

Cutting tool 28 is now set into motion and template 30 driven around stylus roll 34 in the manner to be described below. In the manner well known in the pantograph art, movement of the template 30 about the stylus roll 34, since both the template and work piece are affixed to the pantograph, causes the work piece 24 to move about the cutting tool 28. As noted above in the description of FIGURES 4 and 5, gear 54 is affixed to shaft 52 and gear 54 directly engages the teeth on rack member 36, there being no play between the gear and rack. Shaft 52 passes through the template 30 and there is similarly no play between the shaft and template. Accordingly, through operation of drive wheel 48, rack member 36 may be caused to rotate about the axis of shaft 38 which is keyed thereto and the rotation of the rack member 36 will be transmitted to template 30 by shaft 52. As may clearly be seen from FIGURE 2, operation of drive wheel 48 will cause the template 30 to rotate about the stylus roll 34. As rack member 36 rotates, the template may be kept in contact with the stylus roll and thus the work piece in contact with the cutting tool by means of drive wheel 50 which drives the template along the rack member 36. By the simultaneous operation of drive wheels 48 and 50, the template may be caused to rotate about the stylus roll while remaining in contact with the stylus roll. Restated, drive wheels 48 and 50 are turned to bring the template against the stylus. Thereafter, the template is caused to move keeping pressure on the stylus at all times. The stylus rolls are sturdy and will not be damaged by pressure. Pressure is maintained through manipulation of both drive wheels. That is, pressure must be kept on both drive wheels, and to accomplish this, the direction of rotation of one or the other drive wheels may have to be reversed at times. Thus, the template is kept in firm contact with the stylus by working the two drive wheels against one another. It has been found that this operating technique is readily mastered by even comparatively unskilled personnel.

A particular advantage of the present invention resides in the fact that tool breakage is minimized. This results from the smooth drive of the template and work piece achieved through the novel gearing arrangement in the template tracer-drive assembly mechanism 22 of the present invention. Prior art pantograph devices have been characterized by a single control handle, usually of the joy stick type, and direct drive. Such arrangements result in uneven motion (work piece feed) and contribute to tool breakage.

As noted above, the present invention provides the possibility of making a plurality of cuts to bring a work piece within the desired manufacturing tolerances without the necessity of making major changes in the apparatus. In the prior art, if a plurality of such cuts were to be made, it was necessary to replace the template and, accordingly, it was necessary to have a plurality of the relatively expensive templates available. Further, stylus replacement in the prior art was a time consuming task requiring the removal of set screws and other elements. Thus, had machining by the technique of the present invention been previously conceived, it would not have been practical.

The present invention, due to its novel construction and ease of use, also possesses the advantages of relatively low cost, light weight (portability) and the ability to train operators for its use in a relatively short time.

While a preferred embodiment has been shown and described, various modifications and substitutions may be made thereto without departing from the spirit and scope of the present invention. Accordingly, it is to be understood that the present invention has been disclosed by way of illustration and not limitation.

What is claimed is:

1. Drive means for a pantograph type template tracer comprising:
- a rack member;
- a drive shaft attached to said rack member adjacent one end thereof;
- first drive means engaging said drive shaft for causing rotation of said drive shaft whereby said rack member will rotate about the axis of said drive shaft;
- means connecting said rack member to a first arm of a pantograph whereby a first end of said first arm of said pantograph may be caused to transcribe a circle;
- second drive means for causing said connecting means to move along said rack member where the radius of the circle transcribed by said first end of said first pantograph arm may be varied;
- means positioned about the center of the circle transcribed by said first end of said first pantograph arm; and
- means mounted for movement with said first end of said first pantograph arm, simultaneous operation of said first and second drive means causing said means moving with said first pantograph arm to move about said means positioned about the center of the circle transcribed thereby while maintaining contact therebetween.

2. The apparatus of claim 1 wherein said rack member has a slot therein with teeth extending a portion of the width of the slot and wherein said means for causing motion along said rack member comprises:
- gear means for engaging the teeth on said rack member; and
- bearing means for engaging the walls of the portion of the slot in said rack member where no teeth are present.

3. The apparatus of claim 1 wherein said means positioned about the center of the circle transcribed by said first end of said first pantograph arm comprises:
- a replaceable stylus.

4. The apparatus of claim 3 wherein said means mounted for movement with said first pantograph arm comprises:
- a template commensurate in shape with the finished work.

5. The apparatus of claim 4 further comprising:
- an extension of said drive shaft extending through said rack member, said stylus being installable on the opposite end of said drive shaft from the gear means.

6. The apparatus of claim 5 wherein said stylus comprises:
- a roll member, said roll member being connected to said drive shaft extension by resilient means whereby said roll member may be readily replaced.

7. A method of machining a work piece to a shape commensurate with the shape of a template comprising the steps of:
- mounting a work piece on a first arm of a pantograph;
- mounting a template for movement with a first end of a second arm of a pantograph;
- installing a cutting tool in a tool holder positioned adjacent to the first arm of the pantograph;
- installing a first stylus roll adjacent to the first end of the second pantograph arm, the first stylus roll being selected to have a diameter larger than the pantograph ratio multiplied by the diameter of the tool to be used for machining;
- driving the template around the first stylus roll while maintaining contact therebetween thereby causing the work piece to contact the tool and move thereabout, thereby making a rough cut;
- replacing the first stylus roll with a second roll having a diameter equal to the diameter of the tool multiplied by the ratio of the pantograph; and
- driving the template around the second stylus roll while maintaining contact therebetween to thereby produce a finish cut.

References Cited

UNITED STATES PATENTS

| | | | |
|---|---|---|---|
| 2,289,532 | 7/1942 | Thrasher | 33—25 |
| 2,600,402 | 6/1952 | Griffin | 33—25 X |
| 2,642,660 | 6/1953 | De Vau et al. | 33—23 |
| 2,718,702 | 9/1955 | Glass | 33—25 |

HARRY N. HAROIAN, *Primary Examiner.*